United States Patent
Valli

(10) Patent No.: US 10,556,711 B2
(45) Date of Patent: Feb. 11, 2020

(54) THERMO-SEALING APPARATUS FOR FILLING AND SEALING LIQUID CONTAINERS

(71) Applicant: RIVAC S.R.L., Brusaporto (IT)

(72) Inventor: Riccardo Valli, Brusaporto (IT)

(73) Assignee: COMBIFILL S.R.L., Bernareggio (MB) (IT)

(*) Notice: Subject to any disclaimer, the term of this patent is extended or adjusted under 35 U.S.C. 154(b) by 800 days.

(21) Appl. No.: 15/106,779

(22) PCT Filed: Dec. 20, 2014

(86) PCT No.: PCT/IB2014/067183
§ 371 (c)(1),
(2) Date: Jun. 20, 2016

(87) PCT Pub. No.: WO2015/092772
PCT Pub. Date: Jun. 25, 2015

(65) Prior Publication Data
US 2016/0355282 A1    Dec. 8, 2016

(30) Foreign Application Priority Data

Dec. 20, 2013    (IT) .............................. VA2013A0067

(51) Int. Cl.
*B65B 7/16*         (2006.01)
*B65B 31/02*        (2006.01)
(Continued)

(52) U.S. Cl.
CPC ................ *B65B 7/162* (2013.01); *B65B 3/26* (2013.01); *B65B 31/028* (2013.01); *B65B 39/00* (2013.01); *B65B 41/12* (2013.01); *B65B 65/02* (2013.01)

(58) Field of Classification Search
CPC ......... B65B 7/162; B65B 7/164; B65B 41/12; B29C 65/7451
(Continued)

(56) References Cited

U.S. PATENT DOCUMENTS 4,862,671 A * 9/1989 Lanoiselee .............. B65B 7/164
                                                    53/167
5,054,266 A * 10/1991 Mello ..................... B65B 31/021
                                                    53/433
(Continued)

FOREIGN PATENT DOCUMENTS

EP    2143642 A1    1/2010
FR    2928626 A1    9/2009
(Continued)

OTHER PUBLICATIONS

International Search Report for PCT/IB2011/067183 dated Apr. 13, 2015.

*Primary Examiner* — Janie M Loeppke
(74) *Attorney, Agent, or Firm* — Hedman & Costigan, P.C.; James V. Costigan; Kathleen A. Costigan

(57) ABSTRACT

A thermo-sealing machine for filling containers with liquids and sealing them, comprising a bearing structure on which a bell member is mounted, at a higher position than that of support means for supporting at least a container to be filled and sealed, said bell member comprising a metering device, die-cutting means and sealing means, for die-cutting and sealing a film slidable between said bell member and the container to be filled, said machine being provided with an anti-polluting and operator safety system.

11 Claims, 9 Drawing Sheets

(51) Int. Cl.
    *B65B 3/26*    (2006.01)
    *B65B 39/00*   (2006.01)
    *B65B 41/12*   (2006.01)
    *B65B 65/02*   (2006.01)

(58) Field of Classification Search
    USPC .................................................. 53/511, 520
    See application file for complete search history.

(56) References Cited

U.S. PATENT DOCUMENTS

| | | | |
|---|---|---|---|
| 6,739,109 B1 | 5/2004 | Fan | |
| 2003/0097824 A1* | 5/2003 | Mayer | B01D 61/18 |
| | | | 53/478 |
| 2006/0248860 A1* | 11/2006 | Liao | B65B 31/028 |
| | | | 53/510 |
| 2013/0263559 A1* | 10/2013 | Scolaro | B65B 31/028 |
| | | | 53/485 |

FOREIGN PATENT DOCUMENTS

| | | |
|---|---|---|
| JP | 2007161336 A | 6/2007 |
| WO | 02/02405 A1 | 1/2002 |

* cited by examiner

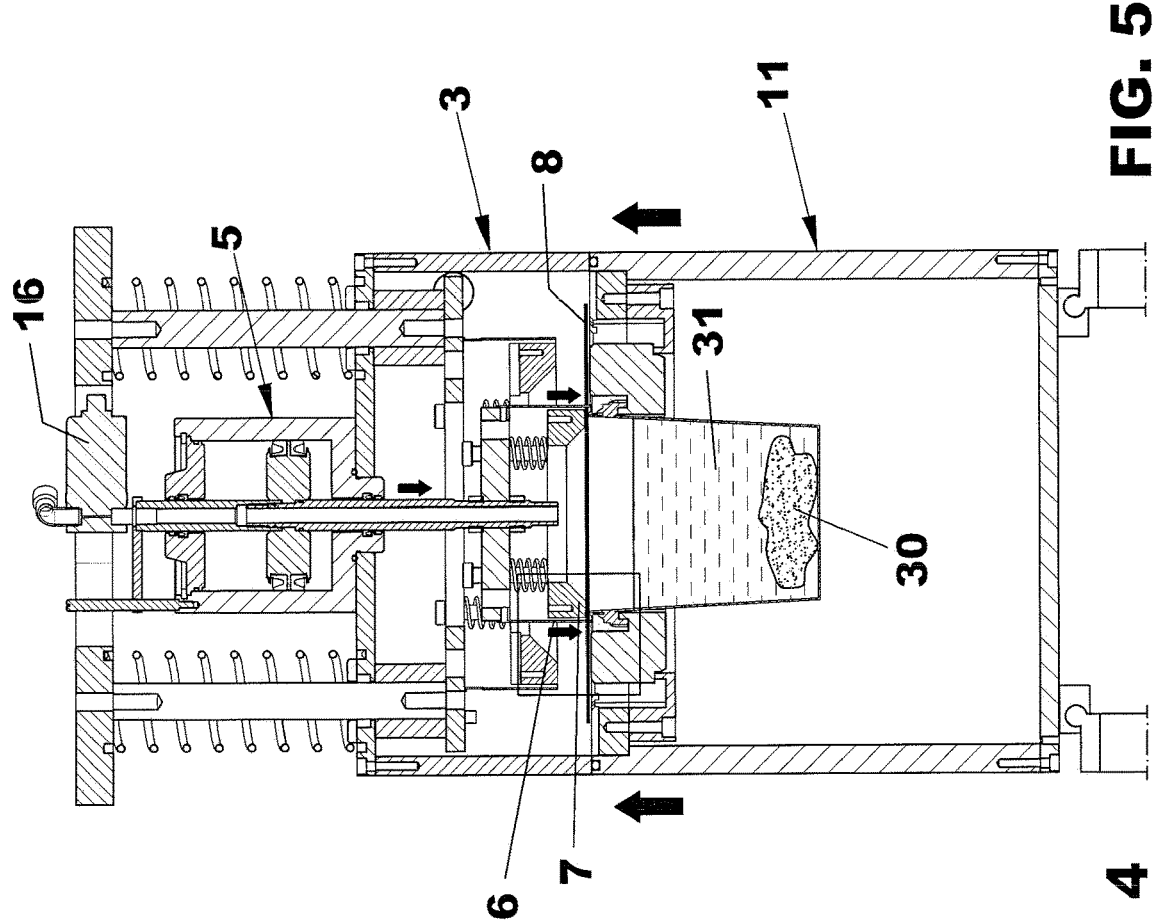
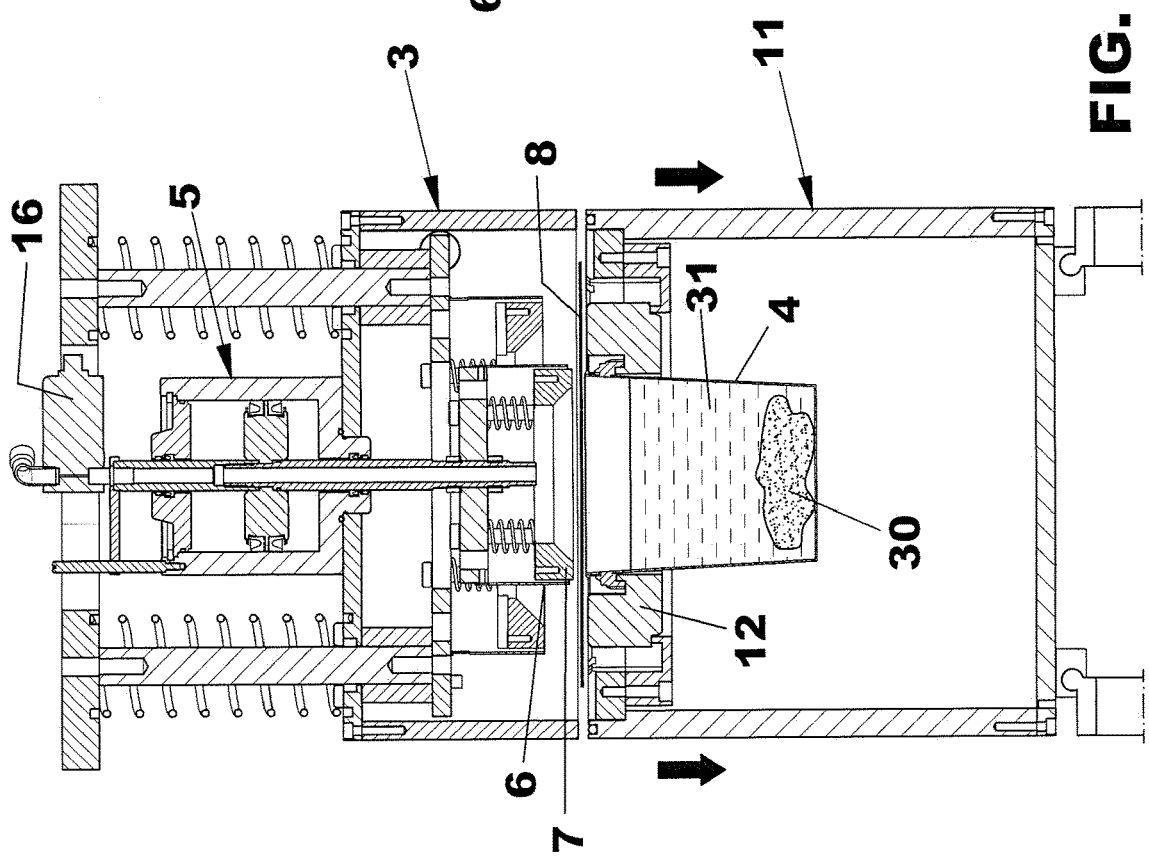

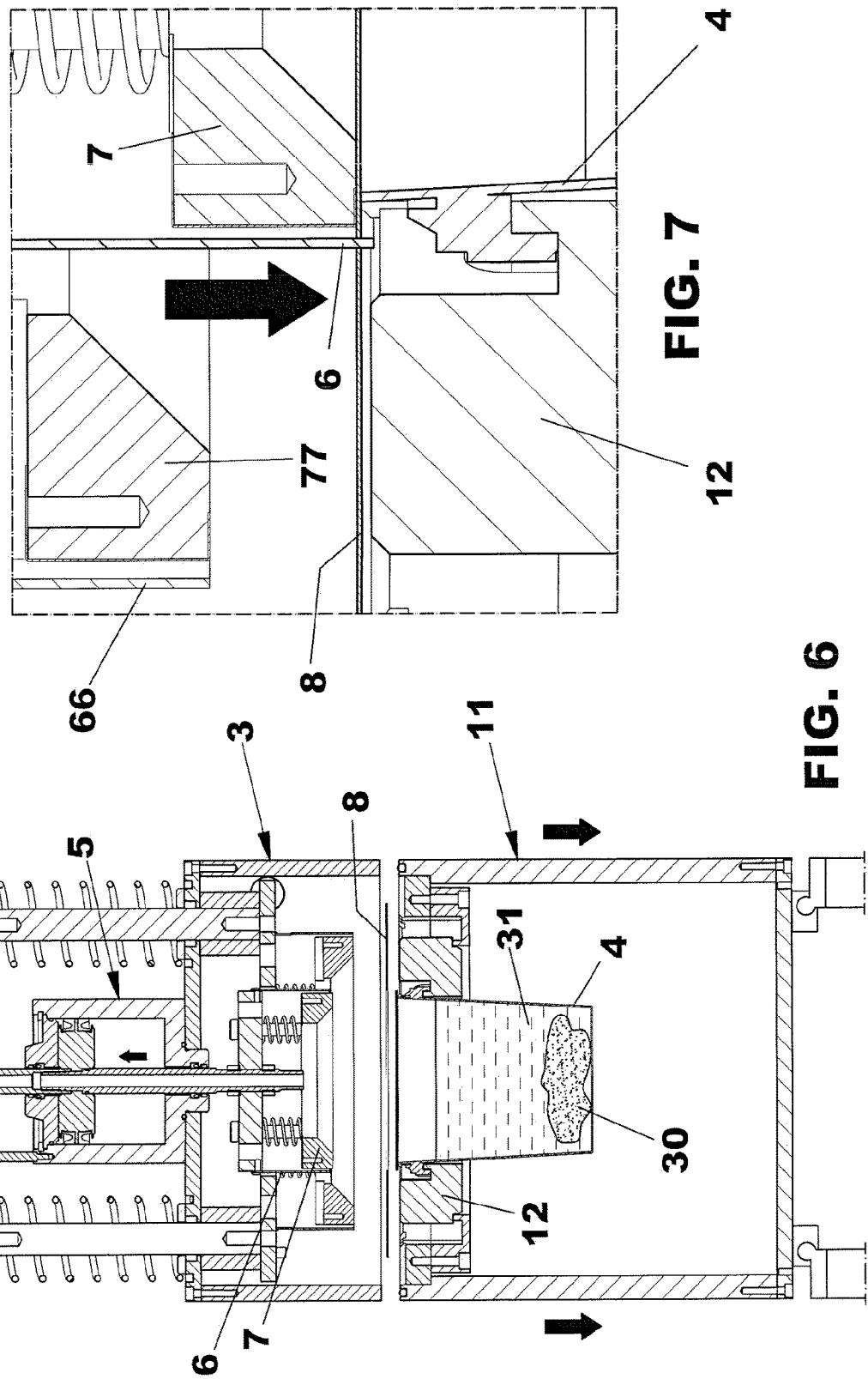

THERMO-SEALING APPARATUS FOR FILLING AND SEALING LIQUID CONTAINERS

BACKGROUND OF THE INVENTION

The present invention relates to a thermo-sealing apparatus for filling containers with liquids and sealing said containers.

As is known, for preserving biologic material samples are frequently used solutions of formic aldehyde, known by the commercial name of formalin.

For example, in a hospital environment, the biologic materials are preserved in formalin contained in sealed containers to allow the preserved samples to be analyzed as desired.

The use of formalin has at least two main problems.

The first is that it is necessary to properly meter the formalin amount used for each sample, since an excessive dose would alter the sample thereby preventing it from being properly tested, whereas an insufficient dose would prevent the sample to be properly preserved.

The second main problem is to reduce as far as possible an exposure of the operators to formalin and vapors thereof.

In fact, formaldehyde has been entered by the "Associazione Internazionale per la Ricerca sul Cancro" in a list of substances considered as carcinogenic for the human beings.

SUMMARY OF THE INVENTION

The aim of the present invention is to provide a thermo-sealing machine for filling containers with liquids and sealing them, allowing to precisely and automatically meter the liquid while preventing any undesired exposure of the operators to said liquids or vapors thereof.

Within the scope of the above mentioned aim, a main object of the invention is to provide such a machine which has been specifically designed for using formalin to preserve biologic material samples in sealed containers or vessels.

Another object is to provide such a machine adapted to operate with different size containers.

Yet another object of the present invention is to provide such a machine which, owing to its specifically designed constructional features, is very reliable and safe in operation.

According to one aspect of the present invention, the above mentioned aim and objects, as well as yet other objects, which will become more apparent hereinafter, are achieved by a thermo-sealing machine for filling containers with liquids and sealing them, characterized in that said machine comprises a bearing structure on which a bell element is mounted, at a top position with respect to support means for supporting at least a container to be filled and sealed.

Said bell member comprises a metering device, die-cutting means and sealing means, adapted to die-cut and seal a film sliding between said bell member and the container to be filled.

The machine is characterized in that it further comprises an anti-polluting and safety system for the operator.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative but not limitative example, in the accompanying drawings, where:

FIG. 4 is a view similar to FIG. 3, showing a partially re-opening operating step for partially re-opening the bell member for causing a die-cut film to slide therethrough;

FIG. 5 is a view similar to FIG. 4, showing a further operating step for tightly closing the bell member to perform a vacuum, gas and/or sealing operating cycle;

FIG. 6 is a view similar to FIG. 5, showing an operating step for opening the bell member to remove the container therefrom;

FIG. 7 is a partially cross-sectioned view, on an enlarged scale, showing in a detailed manner a portion of the die-cut member and of the sealing die;

DESCRIPTION OF THE PREFERRED EMBODIMENTS

Figure 1:
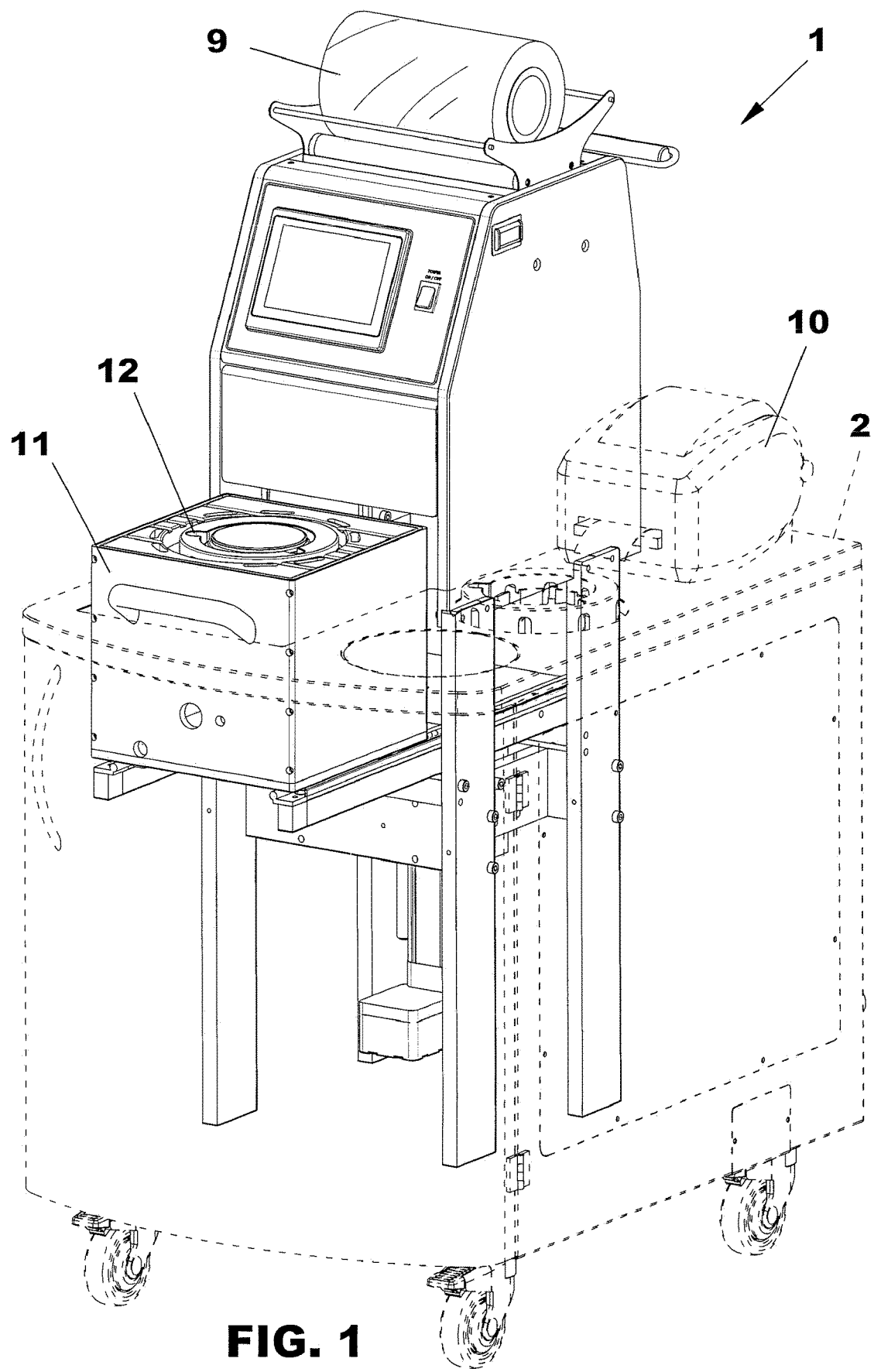
FIG. 1 is a perspective view of the thermo-sealing machine for filling containers with liquids and sealing them, according to the present invention, being partially shown by dashed lines.

With reference to the number references of the above mentioned figures, the thermo-sealing machine for filling containers with liquids and sealing them, according to the present invention, which has been generally indicated by the reference number 1, comprises a bearing structure 2, optionally of a wheel-mounted type, on which a bell member 3 is assembled, at a higher position than that of supporting means for supporting at least a vessel or container 4, 44 to be filled and sealed.

The bell member 3 comprises a metering device 5, die-cutting means 6, 66, sealing means 7, 77, provided for die-cutting and sealing a film 8, slidingly movable between the bell member 3 and the container 4, 44 to be filled.

Said film 8 is supplied from a film bobbin 9 and entrained by entraining or driving means 10, preferably comprising an electric motor.

The container supporting means comprise a drawer member 11, including a counter-biasing recess 12 and provided for supporting a small size container 4.

Figure 8:
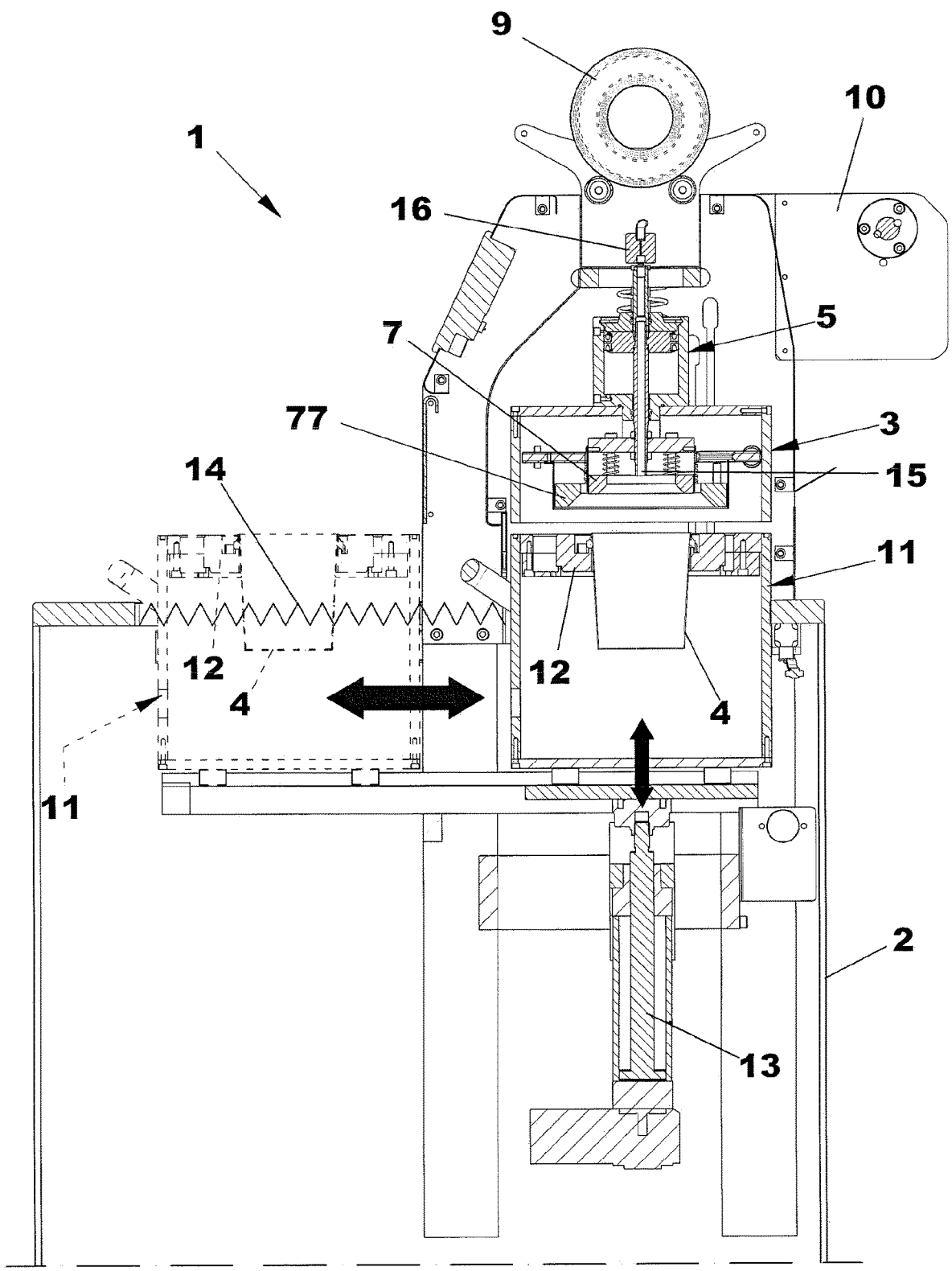
FIG. 8 is a side elevation view of the overall machine or apparatus.
Figure 9:
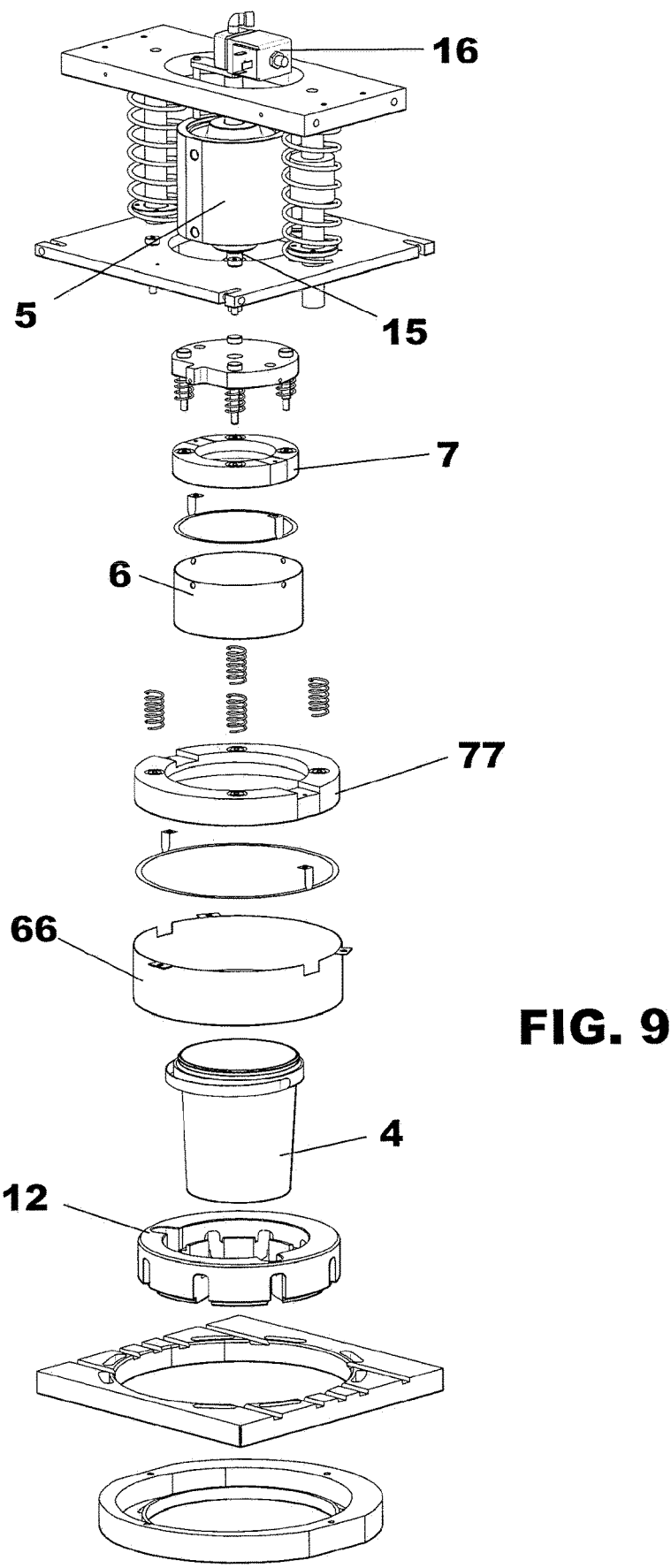
FIG. 9 is an exploded view showing the bell member and a system for supporting a container.
Figure 11:
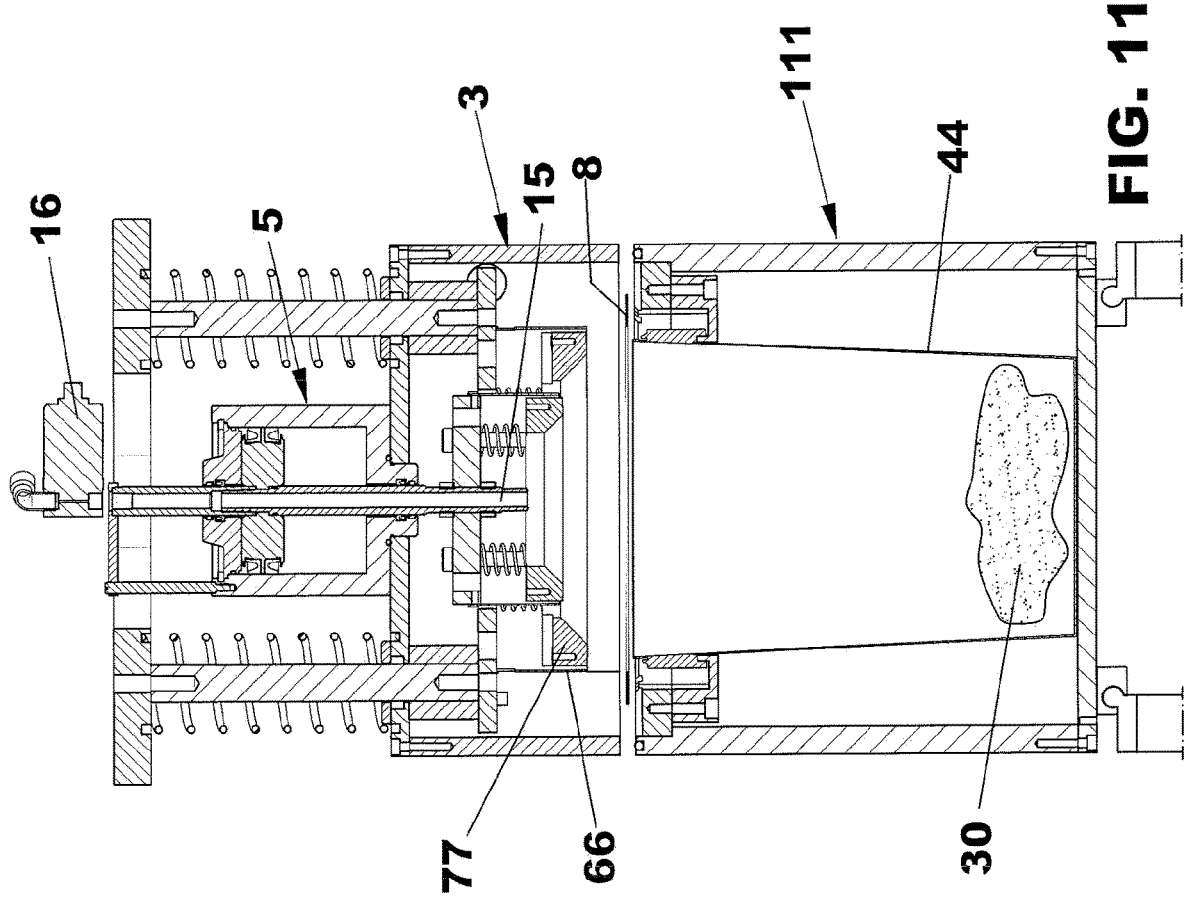
FIG. 11 is a partially cross-sectioned front elevation view showing the metering device and the sealing device, in an operating step for loading a large size container to be filled with liquid and sealed.
Figure 10:
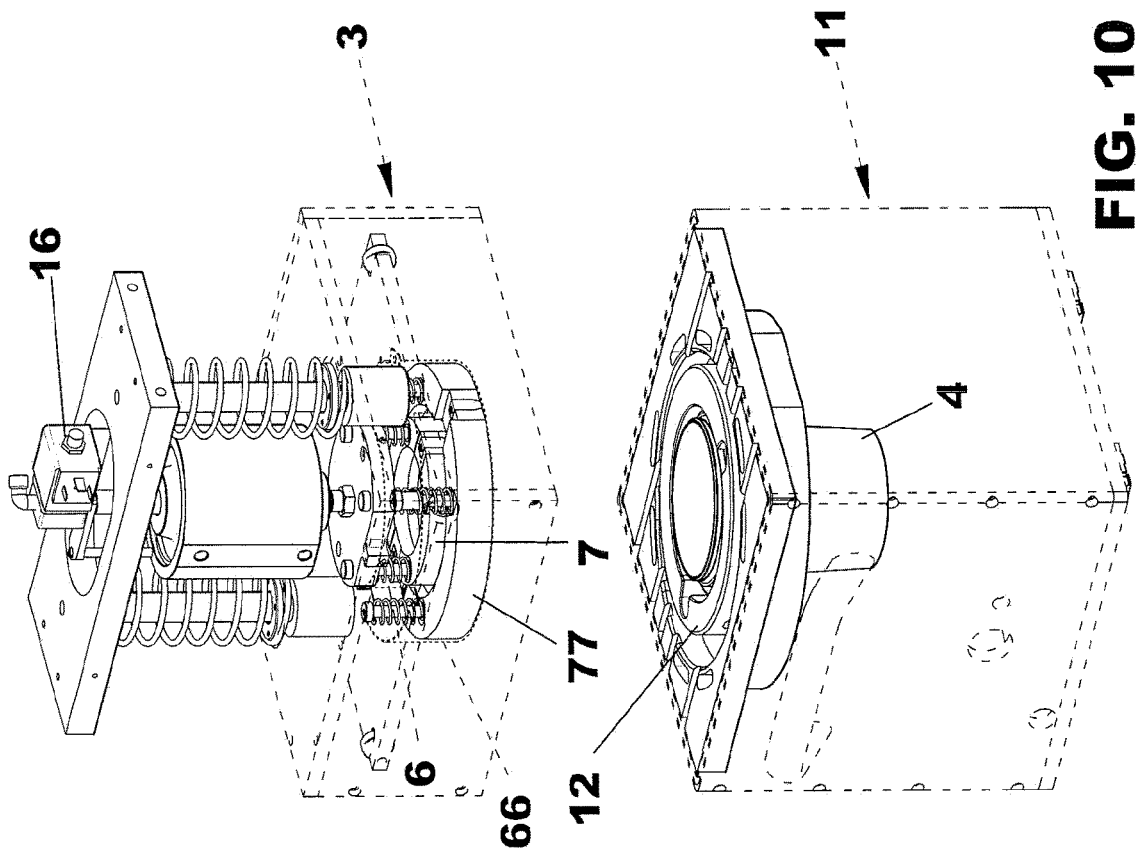
FIG. 10 is a perspective view of the bell member and the container supporting system in an assembled condition thereof.
Figure 12:
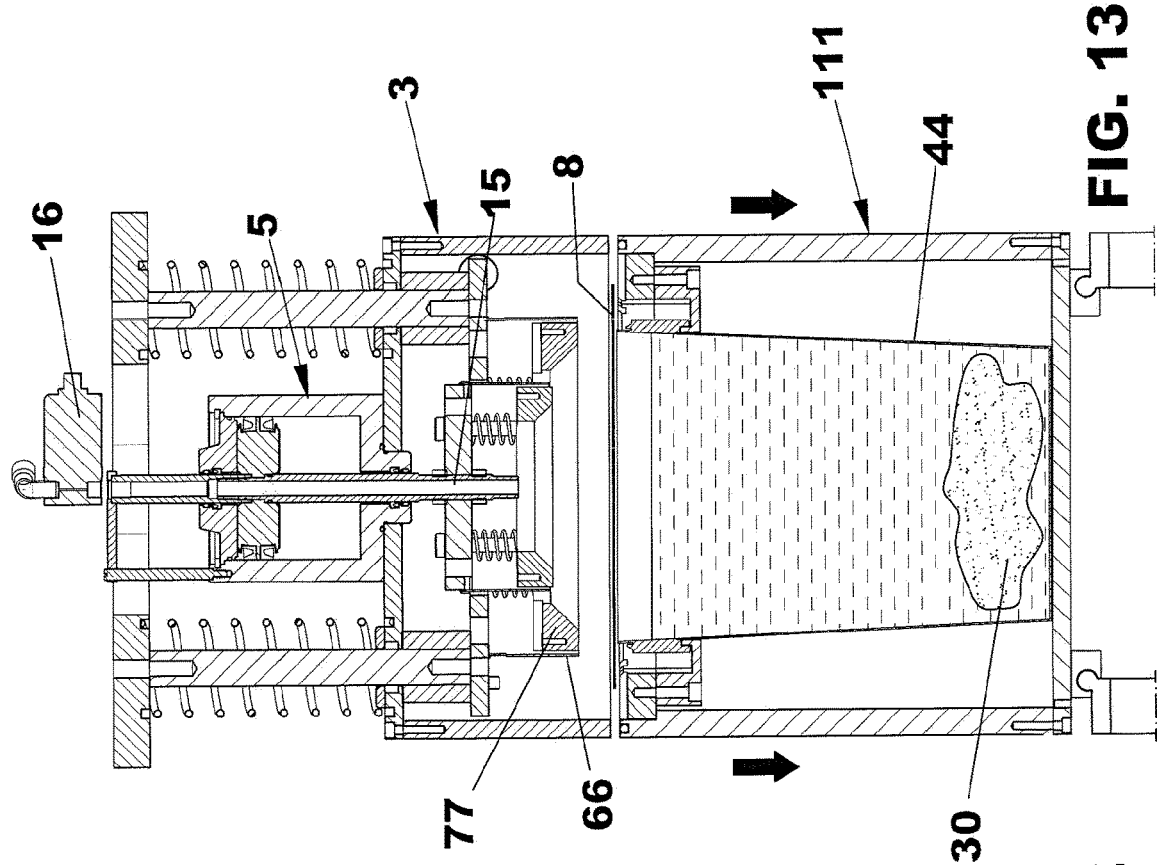
FIG. 12 is a view similar to FIG. 11, showing a liquid injection operating step.
Figure 13:
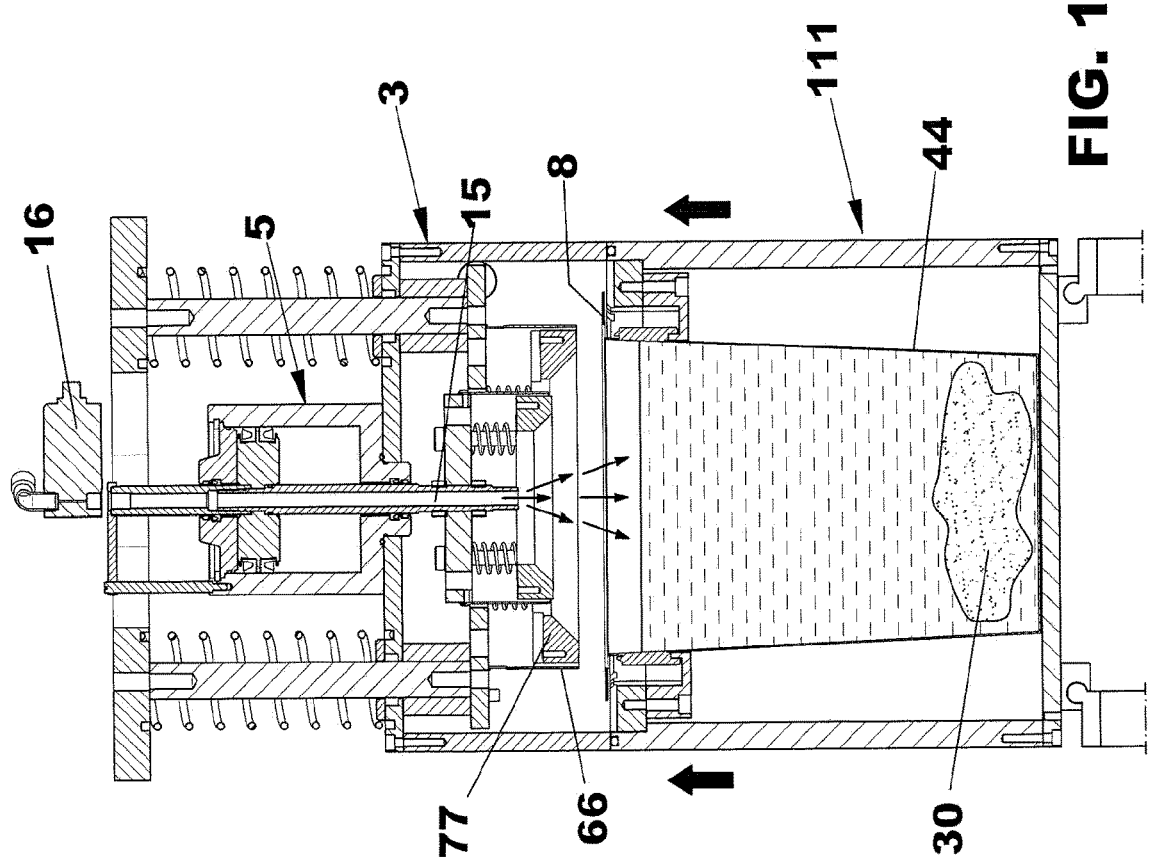
FIG. 13 is a view similar to FIG. 12, showing an operating step for partially re-opening the bell member for allowing the die-cut film to slide therethrough.
Figure 14:
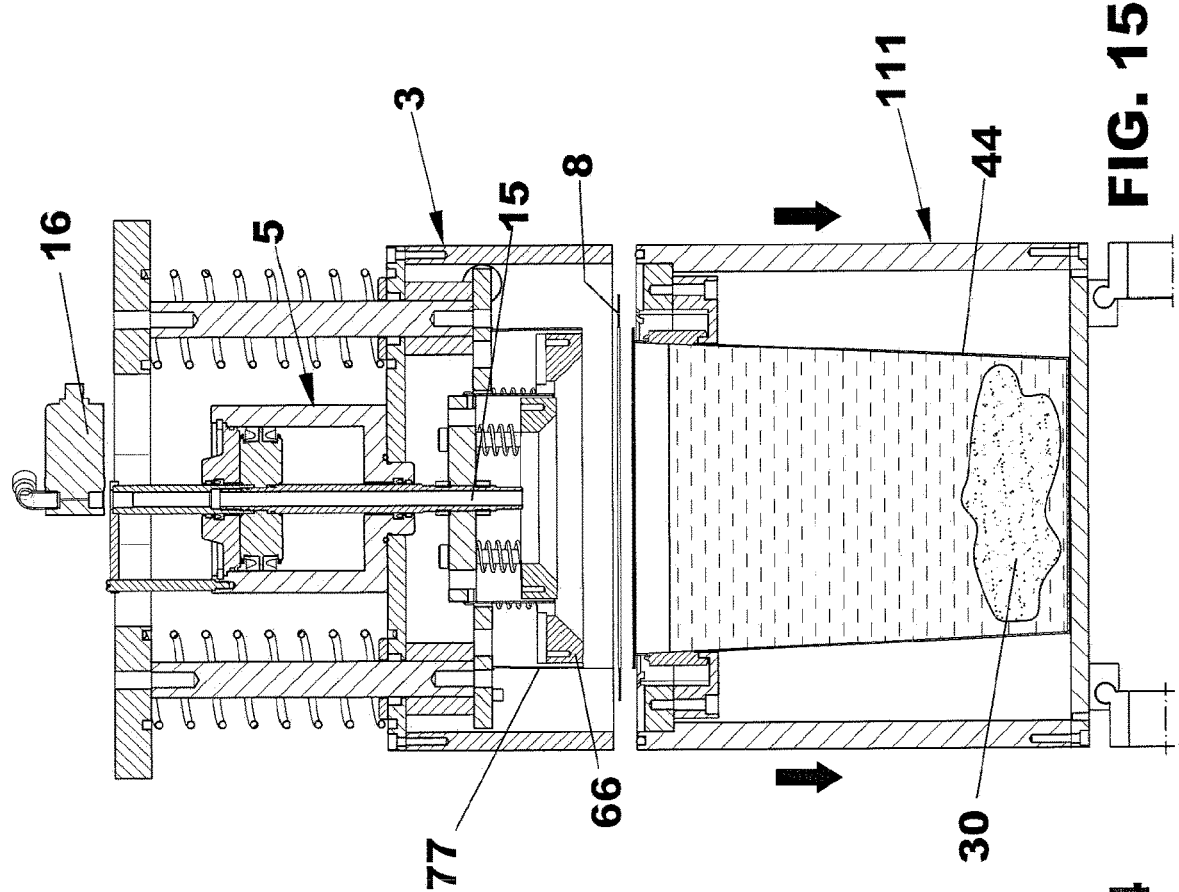
FIG. 14 is a view similar to FIG. 13, showing an operating step for tightly re-closing the bell member to perform a vacuum, gas and/or sealing operating cycle.
Figure 15:
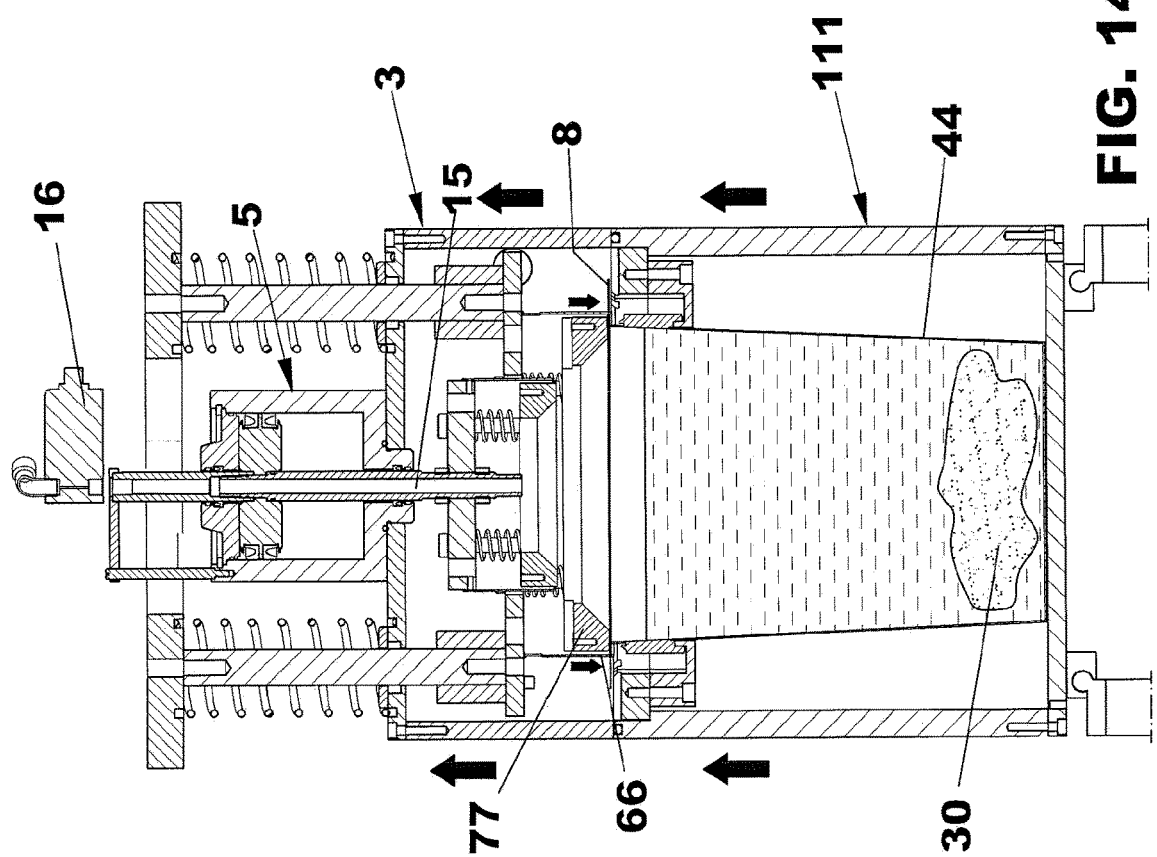
FIG. 15 is a view similar to FIG. 14, showing an operating step for opening the bell member to remove a container therefrom.

A lifting device 13 is herein provided for vertically displacing the drawer member 11, as schematically shown in FIG. 8, to displace in turn the container 4 from a sealing and filling position to a lowered position for allowing the film to properly slide therethrough.

The support means comprise moreover a second drawer member 111, provided for supporting a larger size container 44.

The second drawer member 111 is not vertically movable, and only the bell member 4 is vertically displaced or driven, between a sealing and filling position and a film 8 sliding position.

Between the drawer member 11 and the cover of the machine 1, a bellows member 14 is arranged for providing a tight or sealed relationship between the inner part of the machine and the outer environment, while allowing said drawer member to be crosswise driven.

The metering device 5 comprises a nozzle 15, driven by a metering pump 16 and coupled to a supply tube, in turn coupled to a liquid tank.

The die-cutting means of the bell member 3 comprise a first cylindric die-cut member 6 and a second cylindric die-cut member 66 having a larger diameter than that of the first die-cut member 6 and coaxially extending therewith.

The first die-cut member 6 is mounted on a first sealing ring element 7, which forms, in cooperation with a second sealing ring element 77, said sealing means.

The second die-cut member 66 is mounted on the second sealing ring element 77.

Said cylindric die-cut members 6 and 66 are arranged outside of the respective sealing ring elements 7 and 77.

Each die-cut member-ring element pair is vertically movable, in an independent manner from one another, so as to be displaced from a raised position to a lowered position where the die-cut member 6 or 66 will die-cut the film 8 and the respective ring element 7 or 77 will perform a sealing of the film 8 on the edge of the container 4 or 44.

Advantageously, the sealing operation is a cold-sealing operation.

The machine comprises moreover a suction system for sucking vapors which may be produced during the injection step.

The thermo-sealing machine according to the present invention allows to package under vacuum or in a controlled atmosphere condition liquid containers, by an anti-polluting and operator safety system.

The operation of the machine according to the present invention will be hereinbelow disclosed with reference to a small diameter container 4.

More specifically, a container 4, containing a sample 30, is engaged in the counter-biasing recess 12 provided in the drawer member 11, as the latter is arranged in a withdrawn position thereof shown by dashed lines in FIG. 8.

Figure 2:
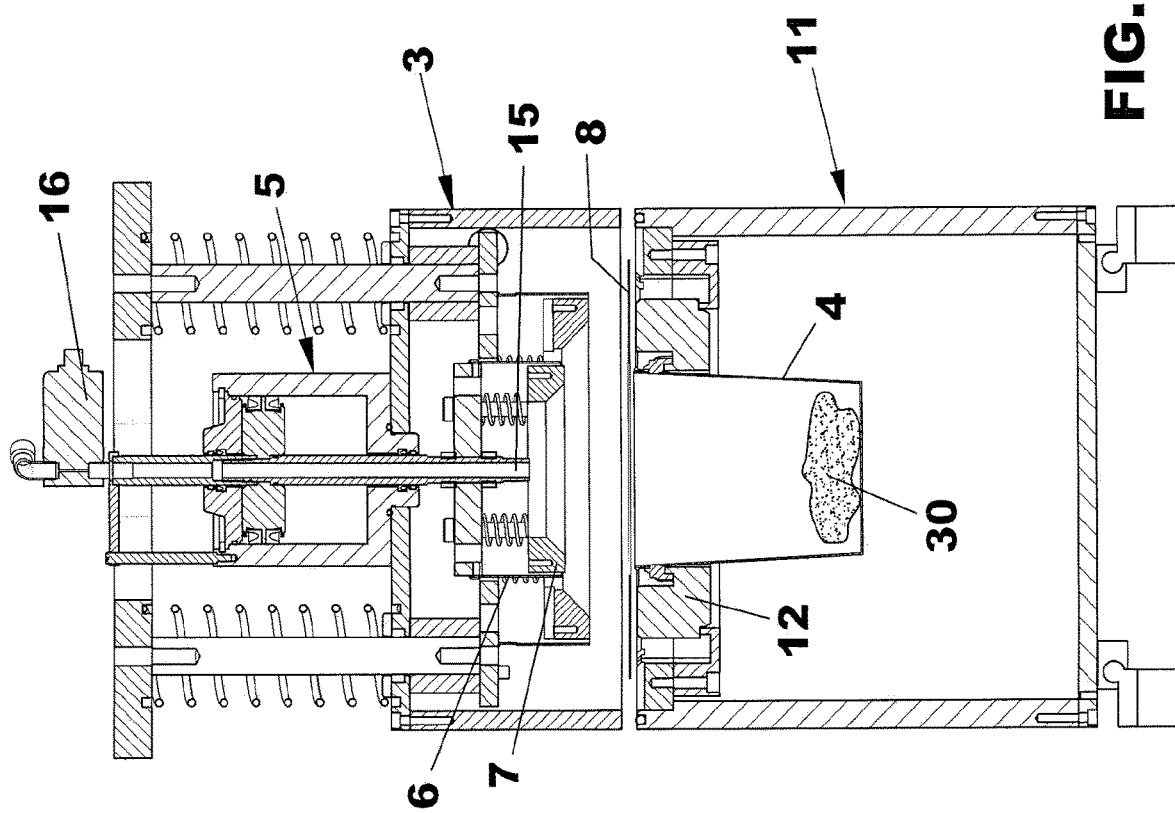
FIG. 2 is a partially cross-sectioned front elevation view showing a metering device and a sealing device in a loading operating step for loading a container to be filled with a liquid and sealed.

Then, the drawer member 11 is engaged in the machine body at a liquid feeding and sealing position, which is shown by continuous lines in said FIG. 8 and moreover in FIG. 2.

Figure 3:
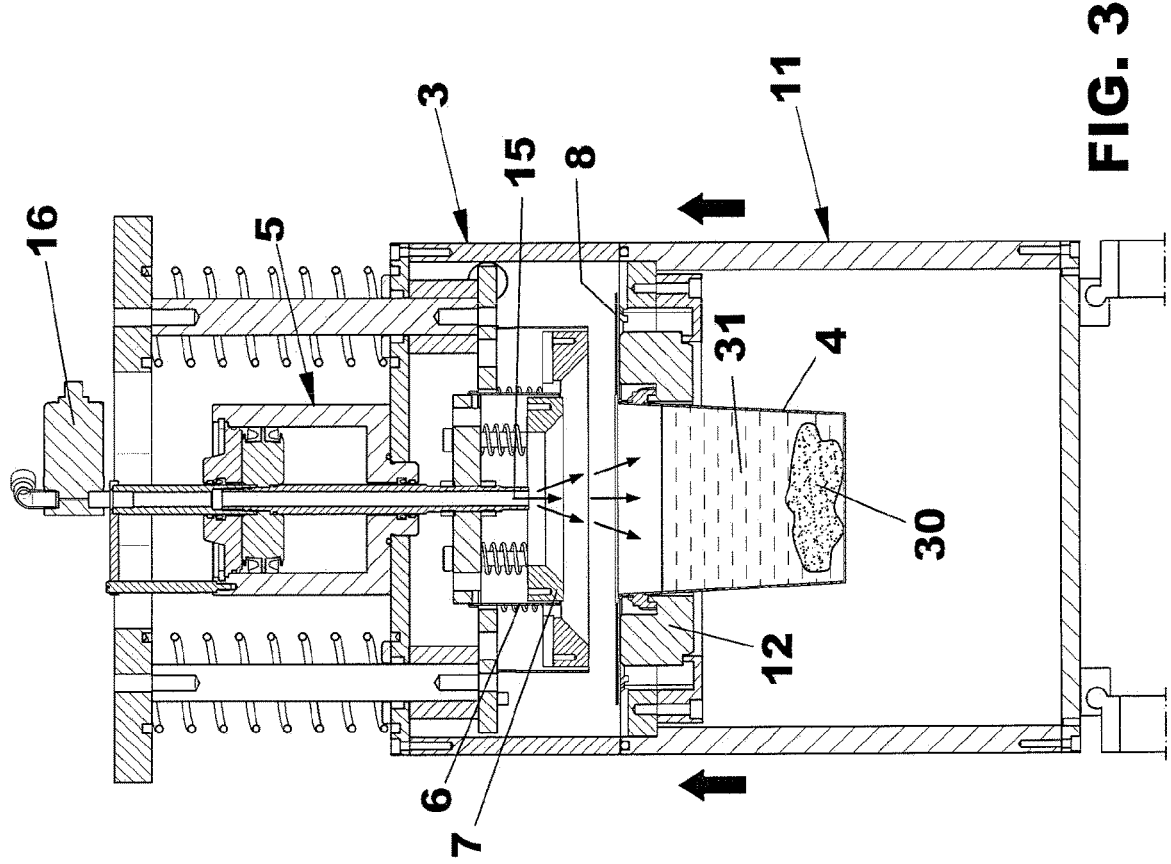
FIG. 3 is a view similar to FIG. 2, showing a liquid injecting operating step.

The bell member 4 is then automatically lowered and the metering device 5 will inject a given amount of liquid 31, for example formalin, into the container 4 through the injection nozzle 15, as shown in FIG. 3.

Thus, the liquid 31 will enter the container 4 through an opening preformed in the film 8 in a preceding loading operation, as it will be disclosed hereinbelow.

The bell member is spaced from the top edge of the container to allow the film 8 to properly slide so as to cover the container, as shown in FIG. 4.

Then, the bell 4 is again tightly closed on the drawer member, and in this time the machine will perform a vacuum, gas and sealing operating cycle, or it will perform only the sealing operation, depending on the product packaging requirements.

More specifically, the sealing is performed by a cold-sealing or welding operation, performed through the sealing or welding ring element 7.

In this operating step, shown in FIG. 5, an atmosphere communicating solenoid valve is opened, and simultaneously a further solenoid valve coupled to the suction device is also opened.

Then, the bell member is automatically re-opened, as shown in FIG. 6, and the drawer member 11 is withdrawn.

In this position it is possible to remove the container, in a sealed condition, and the machine will be ready for performing a following operating cycle with a film 8 already die-cut by the cylindric die-cut member 6 during the second closure of the bell member 4.

In an operation with the small diameter container 4, the opening and closing of the bell member are performed by lowering and raising the drawer member 11 through the raising or lifting device 13.

The operation of the inventive machine for a greater size container 44 is analogous to the preceding one, with the difference that the die-cutting and sealing operations are performed by the outermost cylindric die-cut member 66 and the corresponding sealing ring element 77.

Moreover, for a larger diameter container 44, the support drawer 111 is not vertically movable, and only the bell member 4 will be driven for performing its opening and closing operations.

It has been found that the invention fully achieves the intended aim and objects.

In fact, the invention has provided a machine including an efficient anti-polluting and operator safety system, allowing containers to be automatically filled with liquids and sealed.

According to the present invention, the film, entrained by an electric motor between the container and the corresponding sealing ring element, allows the injected liquid to pass through the die-cut openings of the film performed in a preceding operating cycle; after the metering cycle, the film will be again fed to be further sealed and die-cut on the container.

In practicing the invention, the used materials, as well as the contingent size and shapes, can be any according to requirements.

The invention claimed is:

1. A thermo-sealing machine for filling containers with a solution of formic aldehyde and sealing them, said machine comprising:
  a bearing structure;
  a bell member mounted on said bearing structure;
  a drawer member for supporting at least a container to be filled and sealed, said drawer member being selectively arrangeable below said bell member, said bell member and said drawer member being movable relative to each other between a metering and sealing position, in which said bell member and said drawer member form a closed environment, and a spaced-apart position in which said bell member is spaced from said drawer member;
  a film which is slidable between said bell member and a container supported by said drawer member when said bell member and said drawer member are in said metering and sealing position;

a metering device adapted to meter said solution of formic aldehyde, said metering device comprising an injection nozzle which is arranged inside said closed environment of said metering and sealing position formed by said bell member and said drawer member;

a die-cutting device arranged inside said closed environment of said metering and sealing position formed by said bell member and said drawer member, said die-cutting device being adapted to die-cut said film inside said closed environment of said metering and sealing position;

a sealing device arranged inside said closed environment of said metering and sealing position formed by said bell member and said drawer member, said sealing device being adapted to seal said film inside said closed environment of said metering and sealing position.

2. A machine, according to claim 1, characterized in that said film is supplied by a film bobbin or coil and is entrained by an electric motor.

3. A machine, according to claim 1, characterized in that said drawer member comprises a counter-biasing recess adapted to support a said container.

4. A machine, according to claim 3, characterized in that said machine comprises a lifting device for vertically displacing said drawer member, to displace in turn said container from a sealing and filling position to a lowered position for allowing said film to slide.

5. A machine, according to claim 1, comprising a plurality of drawer members adapted to support containers of different sizes.

6. A machine, according to claim 1, characterized in that between said drawer member and a machine cover of said machine, a bellow is arranged, providing tightness between an inner part of the machine and an outer environment, while allowing said drawer member to be cross-wise displaced.

7. A machine, according to claim 1, characterized in that said metering device is driven by a metering pump and coupled to a supply tube in turn coupled to a liquid tank.

8. A machine, according to claim 1, characterized in that said die-cutting device comprises a first cylindric die-cutting member and a second cylindric die-cutting member having a larger diameter than that of the first die-cutting member and coaxial therewith; said first die-cutting member being mounted on a first sealing ring element forming, with a second sealing ring element, said sealing device; said second die-cutting member being mounted on said second sealing ring element, said first and second cylindric die-cutting members being arranged outside of the respective sealing ring elements, each die-cutting member-ring element pair being vertically movable in an independent manner from one another, so as to be driven from a raised position to a lowered position where a die-cutting member die-cuts the film and the respective ring element seals said film on a container edge.

9. A machine, according to claim 1, characterized in that said sealing device is adapted to seal said film by a cold sealing operation.

10. A machine, according to claim 1, characterized in that said machine further comprises a suction system for sucking possible vapors generated during an injection step of said solution of formic aldehyde.

11. A machine according to claim 1, further comprising an anti-polluting and operator safety system.

* * * * *